United States Patent
Johnson et al.

(10) Patent No.: US 9,776,324 B1
(45) Date of Patent: Oct. 3, 2017

(54) ROBOT QUEUEING IN ORDER-FULFILLMENT OPERATIONS

(71) Applicant: LOCUS ROBOTICS CORPORATION, Wilmington, MA (US)

(72) Inventors: Mike Johnson, Ashland, MA (US); Sean Johnson, Danvers, MA (US); Bradley Powers, Lowell, MA (US); Kaitlin Margaret Gallagher, Upton, MA (US)

(73) Assignee: Locus Robotics Corporation, Wilmington, MA (US)

( * ) Notice: Subject to any disclaimer, the term of this patent is extended or adjusted under 35 U.S.C. 154(b) by 0 days.

(21) Appl. No.: 15/081,124

(22) Filed: Mar. 25, 2016

(51) Int. Cl.
  *G05B 19/418*   (2006.01)
  *G06F 7/00*    (2006.01)
  *B25J 9/16*    (2006.01)

(52) U.S. Cl.
  CPC ... *B25J 9/1666* (2013.01); *G05B 2219/39082* (2013.01); *G05B 2219/40317* (2013.01); *Y10S 901/01* (2013.01)

(58) Field of Classification Search
  CPC .................. B25J 9/1666; Y10S 901/01; G05B 2219/39082; G05B 2219/40317
  USPC .................................. 700/218, 245, 248
  See application file for complete search history.

(56) References Cited

U.S. PATENT DOCUMENTS

| | | | |
|---|---|---|---|
| 5,031,109 A | 7/1991 | Gloton | |
| 6,526,373 B1 | 2/2003 | Barral | |
| 9,519,882 B2 * | 12/2016 | Galluzzo | B25J 5/007 |
| 2007/0021864 A1 | 1/2007 | Mountz | |
| 2011/0000082 A1 * | 1/2011 | Yamashita | B23Q 7/04 29/791 |
| 2012/0152877 A1 * | 6/2012 | Tadayon | B25J 5/02 212/224 |
| 2013/0317642 A1 * | 11/2013 | Asaria | G06Q 50/28 700/216 |

(Continued)

FOREIGN PATENT DOCUMENTS

| | | |
|---|---|---|
| CN | 1924910 | 3/2007 |
| CN | 101956564 | 1/2011 |
| CN | 102915465 | 4/2012 |

(Continued)

OTHER PUBLICATIONS

International Search Report and Written Opinion, dated Jun. 30, 2017, received in international patent application No. PCT/US2017/024194, 13 pgs.

*Primary Examiner* — Michael K Collins
(74) *Attorney, Agent, or Firm* — Verrill Dana, LLP; John W. Powell

(57) ABSTRACT

A method for queuing robots destined for a target location in an environment, includes determining if a first robot occupies the target location and if it is determined that the first robot occupies the target location, determining if a second robot destined for the target location has entered a predefined target zone proximate the target location. If the second robot has entered the predefined target zone, the method further includes navigating the second robot to a first queue location and causing the second robot to wait at the first queue location until the first robot no longer occupies the target location. The method also includes navigating the second robot to the target location after the first robot leaves the target location.

13 Claims, 10 Drawing Sheets

(56) References Cited

U.S. PATENT DOCUMENTS

2014/0100998 A1   4/2014  Mountz
2015/0367513 A1*  12/2015  Gettings ................ G06Q 10/06
                                                        700/248

FOREIGN PATENT DOCUMENTS

CN        103217979       4/2015
CN        104950684       9/2015
JP         57204911      12/1982
WO     2007149227 A2     12/2007

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

ROBOT QUEUEING IN ORDER-FULFILLMENT OPERATIONS

CROSS REFERENCE TO RELATED APPLICATION

This application is a continuation-in-part of U.S. patent application Ser. No. 14/815,246, filed on Jul. 31, 2015, the contents of which are incorporated herein by reference in their entirety.

FIELD OF INVENTION

This invention relates to robot-assisted product order-fulfillment systems and methods and more particularly to queueing of robots destined for a common location.

BACKGROUND

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

With numerous robots navigating a space it is very possible and even likely that robots will attempt to navigate to a position that is occupied by another robot, resulting in a race condition. Race conditions are when two robots are attempting to get to the same place and become processor bound as they attempt to reconcile the changing external environment. Race conditions are very undesirable and can result the robots being unable to perform further operations until the condition is resolved.

SUMMARY

In one aspect the invention features a method for queuing robots destined for a target location in an environment. The method includes determining if a first robot occupies the target location and if it is determined that the first robot occupies the target location, determining if a second robot destined for the target location has entered a predefined target zone proximate the target location. If it is determined that the second robot has entered the predefined target zone, the method includes navigating the second robot to a first queue location and causing the second robot to wait at the first queue location until the first robot no longer occupies the target location. The method also includes navigating the second robot to the target location after the first robot leaves the target location.

In other aspects of the invention, one or more of the following features may be included. The environment may be a warehouse space containing items for customer order fulfillment. The first queue location may be offset from the target location by a predetermined distance. The target location may be defined by a target pose and the first queue location may be defined by a first queue pose. The second robot may navigate to the first queue location by navigating to the first queue pose. The method may further include determining if a third robot destined for the target location has entered the predefined target zone when the first robot occupies the target location and the second robot occupies the first queue location. If it is determined that the third robot has entered the predefined target zone while the first robot occupies the target location and the second robot occupies the first queue location, the method may include navigating the third robot to a second queue location and causing the third robot to wait at the second queue location until the first robot no longer occupies the target location.

In further aspects of the invention, the second queue location may be offset from the first queue location by a predetermined distance. The second queue location may be defined by a second queue pose and the second robot may navigate to the second queue location by navigating to the second queue pose. The method may further include determining if the first robot continues to occupy the target location and if it does not, navigating the second robot to the target location, navigating the third robot to the first queue location, and causing the third robot to wait at the first queue location until the second robot no longer occupies the target location. Navigating the second robot to the target location may include navigating the second robot to the target pose and navigating the third robot to the first queue location may include navigating the second robot to the first queue pose.

Another aspect the invention features a system for queuing robots destined for a target location. There is a management system and at least first and second robots destined for a target location. The management system is configured to communicate with the at least first and second robots and to determine if the first robot occupies the target location. If it is determined that the first robot occupies the target location, then it is determined if a second robot has entered a predefined target zone proximate the target location. If it is determined that the second robot has entered the predefined target zone, the management system navigates the second robot to a queue location and causes the second robot to wait at the predefined queue location until the first robot no longer occupies the target location. The management system then navigates the second robot to the target location after the first robot leaves the target location.

In other aspects of the invention, one or more of the following features may be included. The environment may be a warehouse space containing items for customer order fulfillment. The first queue location may be offset from the target location by a predetermined distance and the target location may be defined by a target pose. The first queue location may be defined by a first queue pose; and the second robot may navigate to the first queue location by navigating to the first queue pose. If a third robot destined for the target location, the management system may be configured to determine if the third robot has entered the predefined target zone when the first robot occupies the target location and the second robot occupies the first queue location. If it is determined that the third robot has entered the predefined target zone while the first robot occupies the target location and the second robot occupies the first queue location, the system may direct the third robot to navigate to a second queue location and causes the third robot to wait at the second queue location until the first robot no longer occupies the target location.

In further aspects of the invention, the second queue location may be offset from the first queue location by a predetermined distance and the second queue location may be defined by a second queue pose. The second robot may navigate to the second queue location by navigating to the second queue pose. The management system may be further configured to determine if the first robot continues to occupy the target location and if it does not, the system may direct the second robot to navigate to the target location. The system may also direct the third robot to navigate to the first queue location and causes the third robot to wait at the first queue location until the second robot no longer occupies the target location. The management system may further configured to direct the second robot to the target location by navigating it to the target pose and it may direct the third robot to the first queue location by navigating it to the first queue pose.

A further aspect of the invention features a robot capable of navigating to predefined locations in an environment containing at least one additional robot. The robot and the at least one additional robot are capable of interacting with a management system. The robot includes a mobile base, a communication device enabling communication between the robot and the management system, and a processor, responsive to communications with the management system. The processor is configured to navigate the robot to a target location in the environment and determine if the at least one additional robot occupies the target location. If it is determined that the at least one additional robot occupies the target location, determine if the robot has entered a predefined target zone proximate the target location. If it is determined that the robot has entered the predefined target zone, the processor is configured to navigate the robot to a queue location and cause the robot to wait at the predefined queue location until the at least one additional robot no longer occupies the target location. The processor is configured to then navigate the robot to the target location after the at least one additional robot leaves the target location.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION

Figure 1:
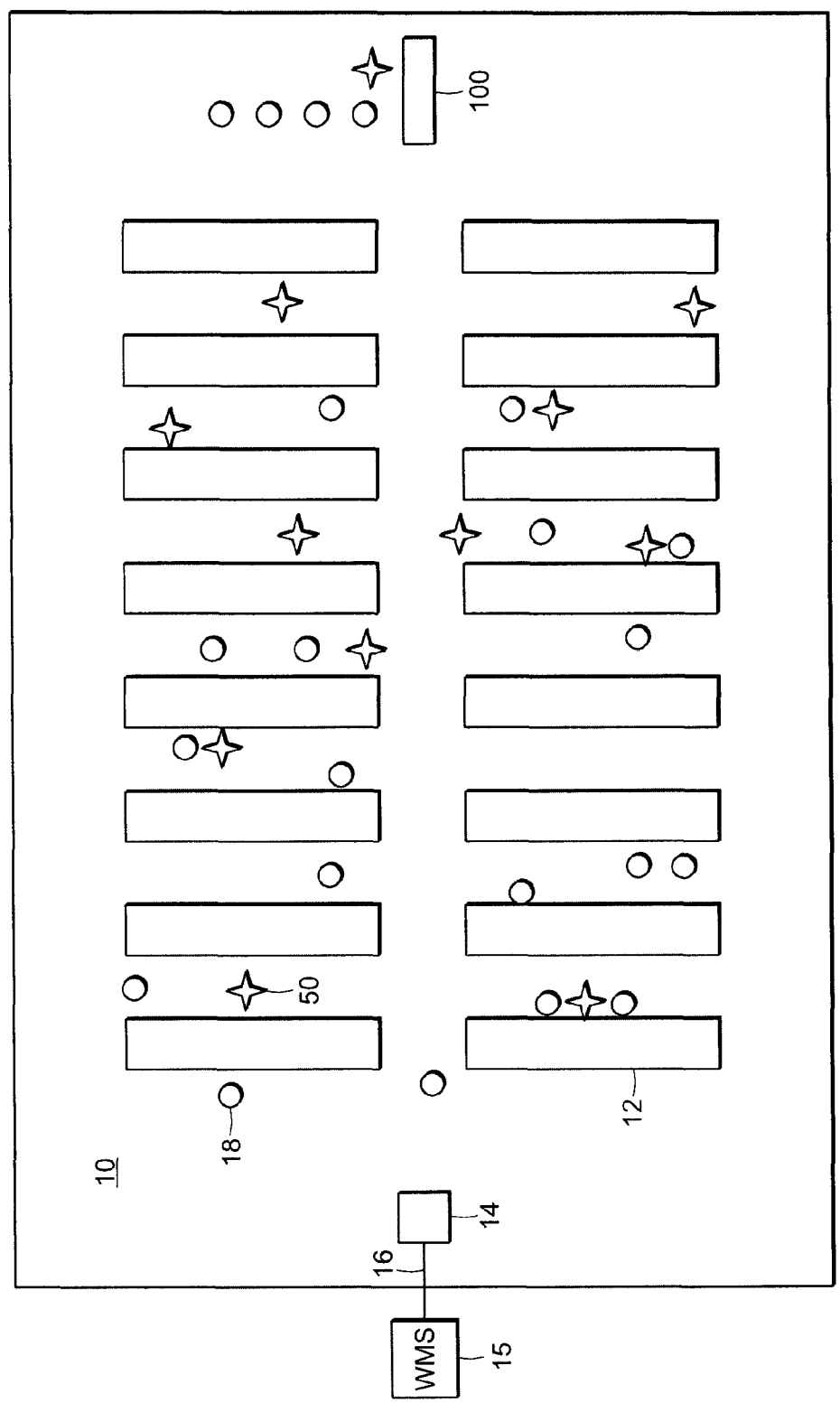
FIG. 1 is a top plan view of an order-fulfillment warehouse.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10.

Figure 2:
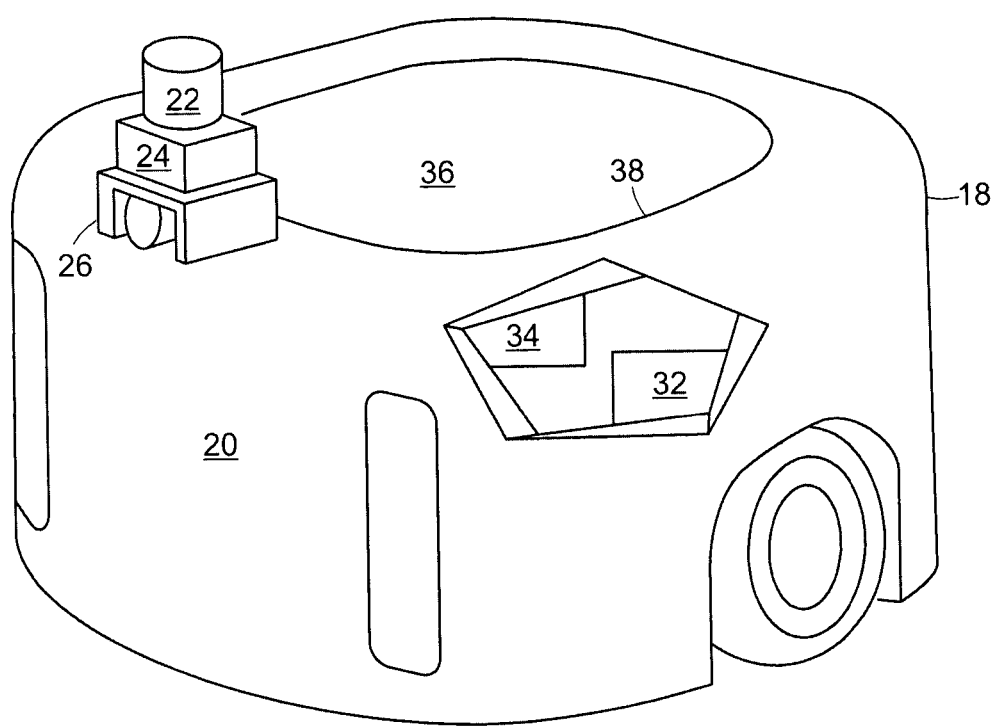
FIG. 2 is a perspective view of a base of one of the robots used in the warehouse shown in FIG. 1.
Figure 3:
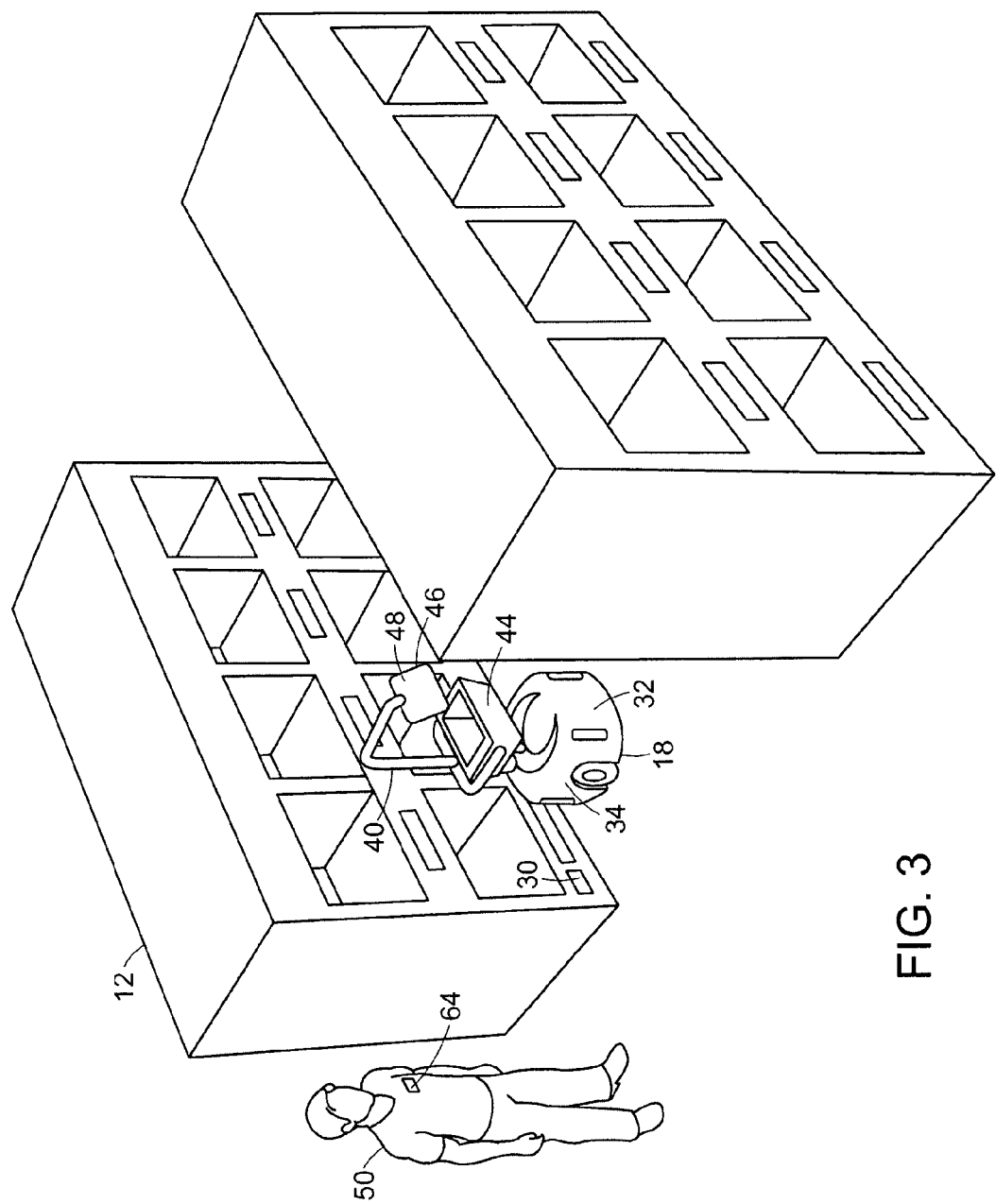
FIG. 3 is a perspective view of the robot in FIG. 2 outfitted with an armature and parked in front of a shelf shown in FIG. 1.

In a preferred embodiment, a robot 18, shown in FIG. 2, includes an autonomous wheeled base 20 having a laser-radar 22. The base 20 also features a transceiver 24 that enables the robot 18 to receive instructions from the order-server 14, and a camera 26. The base 20 also features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

While the initial description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

As described in more detail below, robots 18 can be utilized to perform multiple tasks of different task types in an interleaved fashion. This means that robot 18, while executing a single order traveling throughout the warehouse 10, may be picking items, placing items, and performing inventory control tasks. This kind of interleaved task approach can significantly improve efficiency and performance.

Referring again to FIG. 2, An upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48, which the local operator 50 can read, or by transmitting the order to a handheld device used by the local operator 50.

Upon receiving an order 16 from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one of the robots 18 navigates the warehouse and builds a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
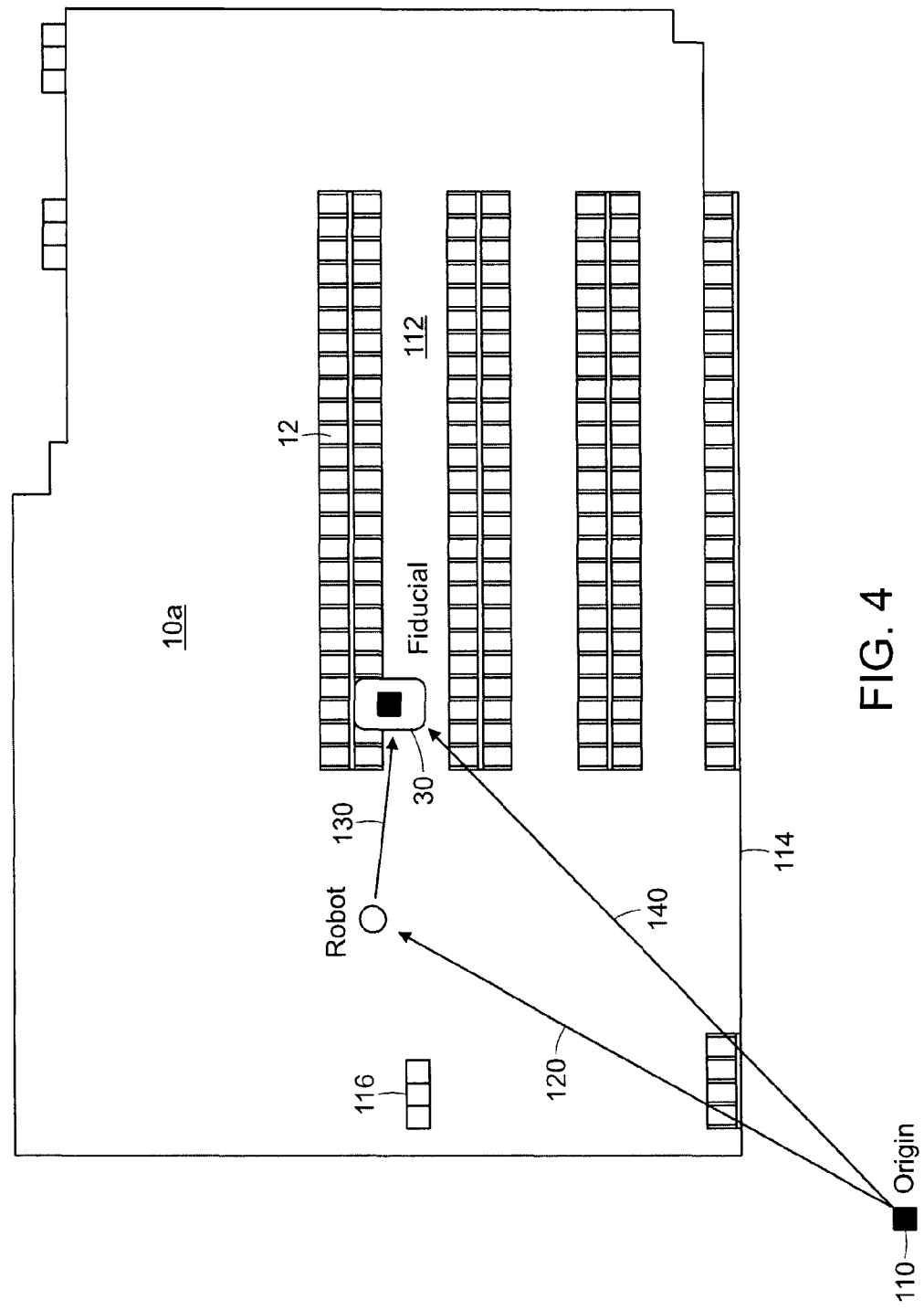
FIG. 4 is a partial map of the warehouse of FIG. 1 created using laser radar on the robot.

While constructing the map 10a or thereafter, one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
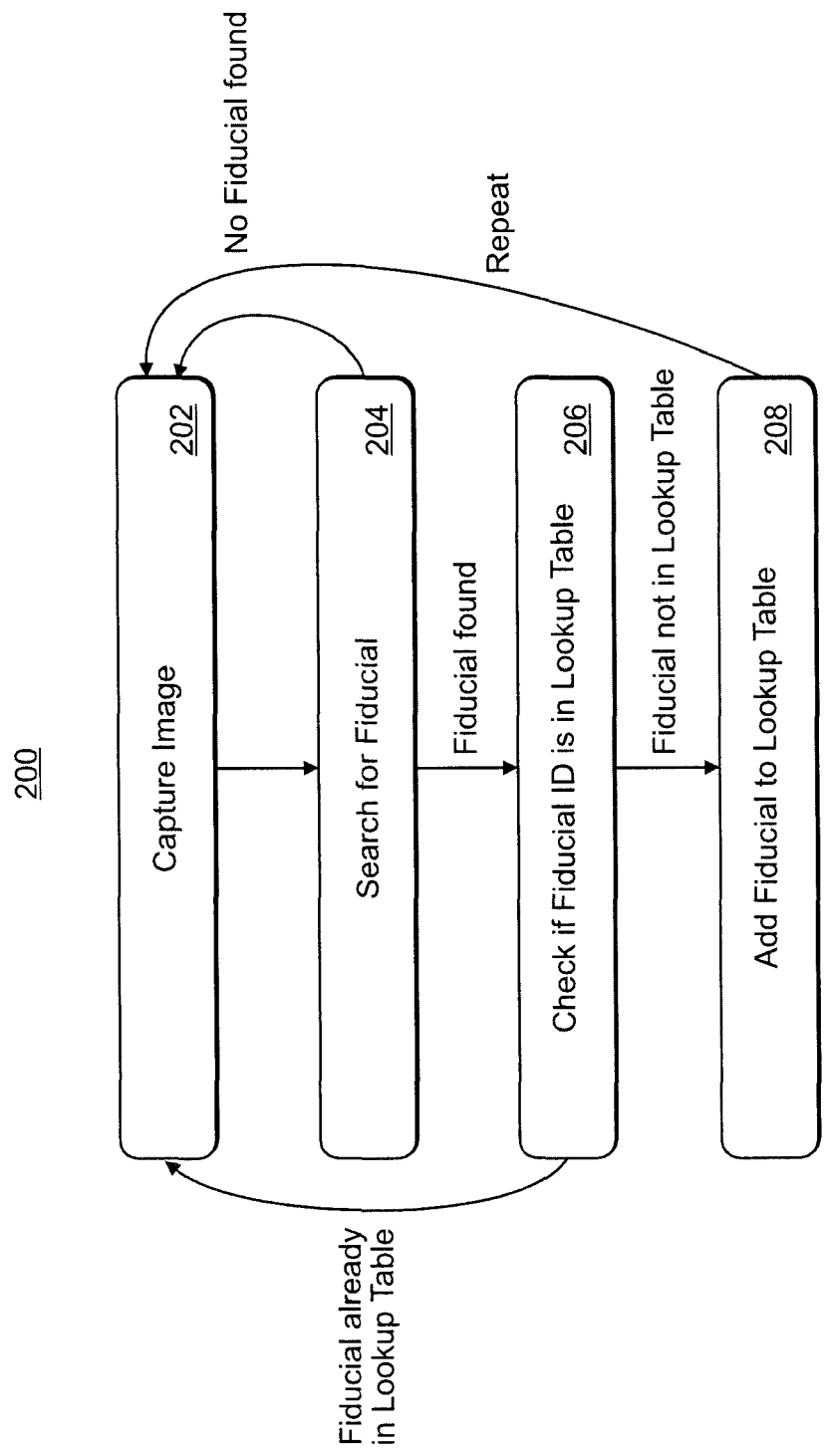
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x,y,z coordinates in the warehouse along with the orientation or the quaternion (x, y, z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alphanumeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose as described herein.

Figure 8:
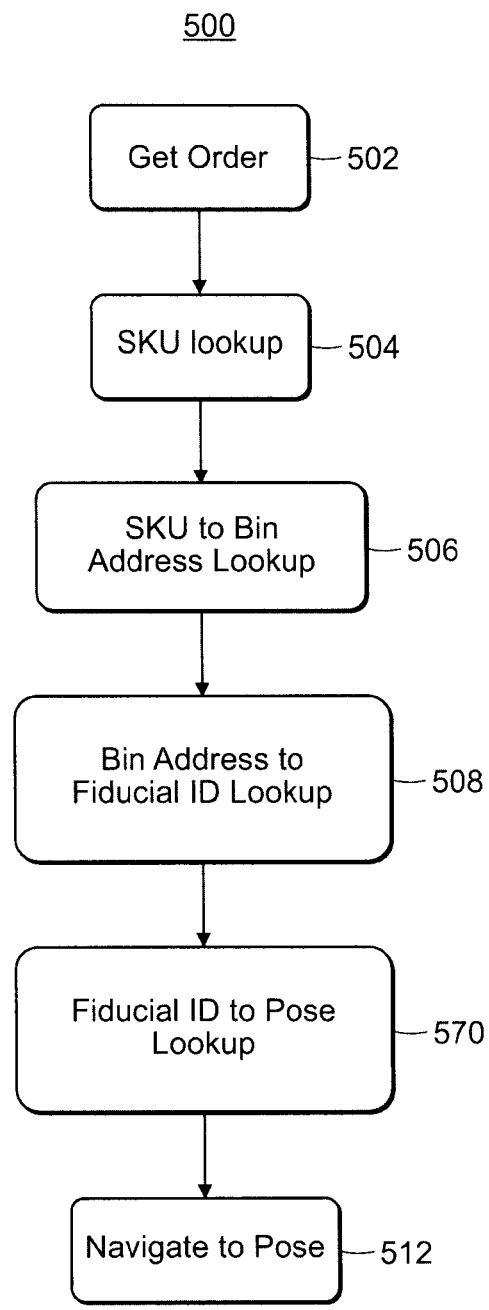
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Figure 9:
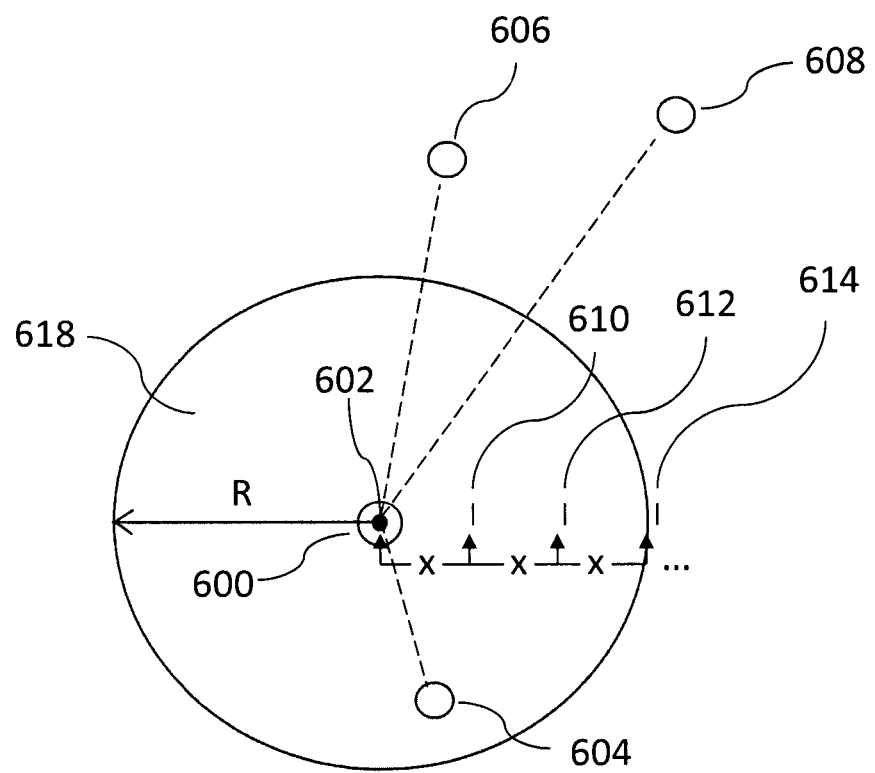
FIG. 9 is schematic view of the target and queue locations used in the queuing process according to this invention.

As described above, a problem that can arise with multiple robots navigating a space is called a "race condition", which can occur if one or more robots attempt to navigate to a space occupied by another robot. With this invention, alternative destinations for the robots are created to place them in a queue and avoid race conditions from occuring. The process is depicted in FIG. 9, where robot 600 is shown positioned at a target location/pose 602. Pose 602 could correspond to any location in a warehouse space, for example, a packing or loading station or a position near a particular bin. When other robots try to navigate to pose 602, such as robots 604, 606, and 608 (as indicated by the dotted lines from the robots and terminating at pose 602) they are redirected to temporary holding locations, such as locations or queue slots 610, 612, and 614.

Queue slots 610, 612, and 614 are offset from pose 612. In this example queue slot 610 is offset from pose 602 by a distance x, which could be, for example, one (1) meter. Queue slot 612 is offset from queue slot 610 by an additional distance x and queue slot 614 is offset another distance x from queue slot 612. While, in this example, the distances are uniformly spaced along a straight line emanating from pose 602, this is not a requirement of the invention. The locations of the queue slots may be non-uniform and variable given the dynamic environment of the warehouse. The queue slots maybe offset according to an queuing algorithm that observes the underlying global map and the existing obstacles and constraints of the local map. The queuing algorithm may also consider the practical limits of queuing in the space proximate the target location/pose to avoid blocking traffic, interfering with other locations, and creating new obstacles.

In addition, the proper queue slotting of robots into the queue must be managed. In the example shown in FIG. 9, the robot with the first priority to occupy the pose 602 is queued in the first queue slot 610, while the other robots are queued in the other queue slots based on their respective priorities. Priorities are determined by the order of the robots' entry into a zone 618 proximate pose 602. In this case, zone 618 is defined by a radius, R, about pose 602, which in this case is approximately three (3) meters (or 3×). The first robot to enter the zone, in this case 604, has the highest priority and is assigned the first queue slot, queue slot 610. When robot 606, which is closer to zone 618 than robot 608, enters zone 618, assuming that robot 600 is still at pose 602 and robot 604 is located at queue slot 610, it has the next highest priority and it is therefore assigned queue slot 612. When robot 608 then enters zone 618, assuming that robot 600 is still at pose 602 and robots 604 and 606 are still located at queue slots 610 and 612, respectively, it is assigned to queue slot 614.

When robot 600 moves from pose 602, robot 604 moves from queue slot 610 to pose 602. Robots 606 and 608 move to queue slot positions 610 and 612, respectively. The next robot to enter zone 618 would be positioned in queue slot position 614. Of course, additional number of queue slot positions could be included to accommodate expected traffic flows.

The manner in which the robots are navigated to the queue slots and ultimately the target location is accomplished by temporarily redirecting them from the pose of the target location to the pose(s) of the queue slot(s). In other words, when it is determined that a robot must be placed in a queue slot, its target pose is temporarily adjusted to a pose corresponding to the location of the queue slot to which it is assigned. As it moves up in position in the queue, the pose is again adjusted temporarily to the pose of the queue slot with the next highest priority until it is able to reach its original target location at which time the pose is reset to the original target pose.

Figure 10:
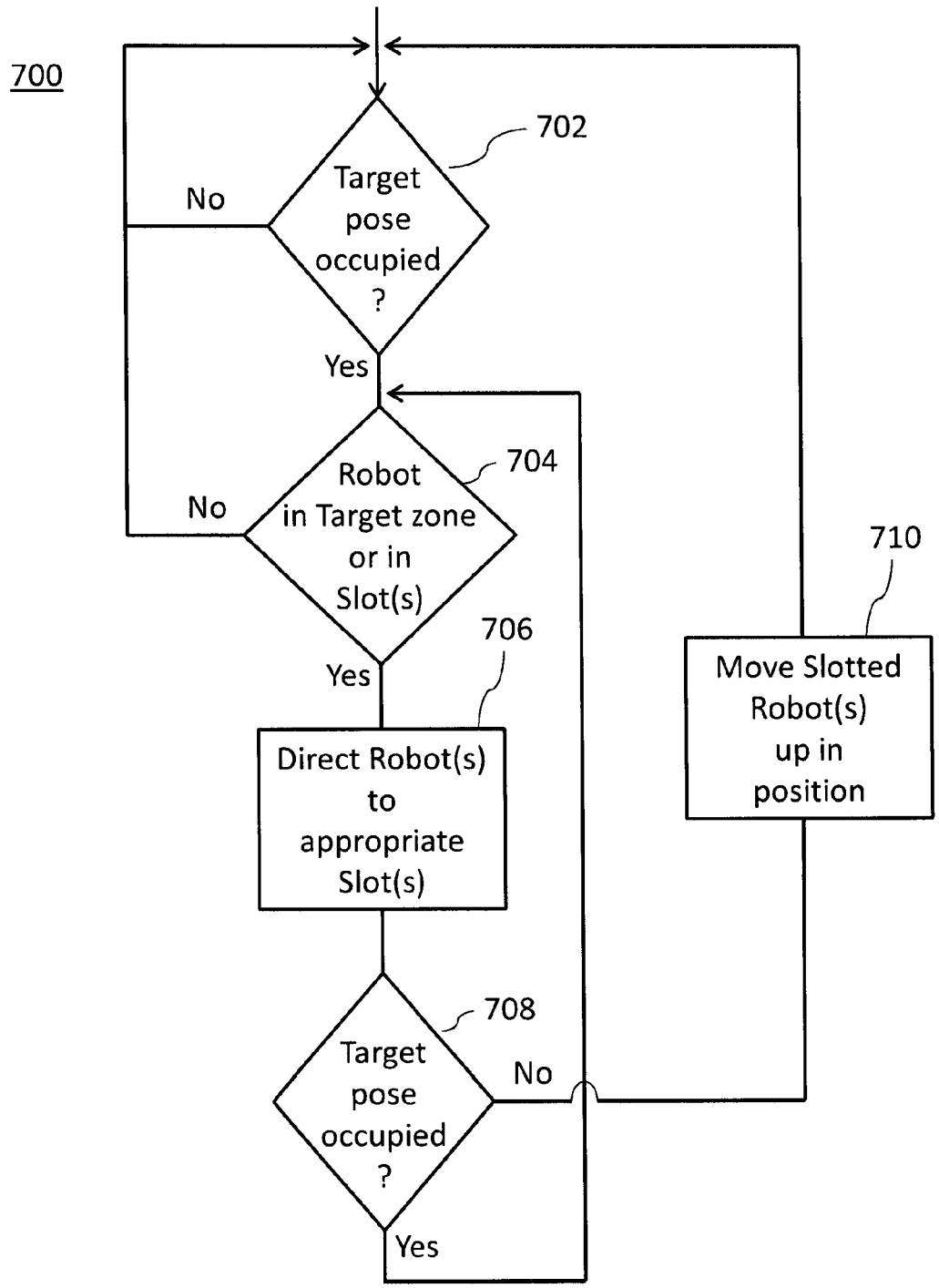
FIG. 10 is a flow chart depicting the robot queuing process according to this invention.

Flow chart 700, FIG. 10, depicts the robot queuing process implemented by WMS 15 for a particular pose (target pose) within the warehouse. At step 702, it is determined if the target pose is occupied by a robot. If it is not, the process returns to step 702 until there is a robot occupying the target pose. When a robot is occupying the target pose, the process determines at step 704 if there is another robot in the target zone or if there is a robot in one or more of the queue slots. If it is determined that there is no robot in the target zone or in one or more queue slots, the process returns to step 702. If it is determined that there is a robot occupying the target pose or if the queue slot(s) is/are occupied, then at step 706 the robots are assigned to the appropriate queue slots.

If there is a robot in the target zone but no robot in the queue slots, then the robot in the target zone is directed to occupy the first queue slot, i.e. queue slot 610, FIG. 9. If there is a robot in the target zone and a robot (or multiple robots in the queue slots) then the robot in the target zone is slotted into the next available queue slot, as described above. If there is no robot in the target zone but there is/are robot(s) in the queue slot(s), then the slotted robots remain in the same positions. At step 708, if it is determined that the target pose is not occupied, then the robots in the queue slots are moved up a position, i.e. queue slot 610 to the target pose, queue slot 612 to queue slot 610 and so forth. If the target pose is still occupied, the process returns to step 704.

Having described the invention, and a preferred embodiment thereof, what is claimed as new and secured by Letters Patent is:

1. A method for queuing robots destined for a target location in an environment, comprising:
   Determining if a first robot occupies the target location;
   If it is determined that the first robot occupies the target location, determining if a second robot destined for the target location has entered a predefined target zone proximate the target location;
   If it is determined that the second robot has entered the predefined target zone, navigating the second robot to a first queue location;
   Determining if a third robot destined for the target location has entered the predefined target zone when the first robot occupies the target location and the second robot occupies the first queue location, if it is determined that the third robot has entered the predefined target zone while the first robot occupies the target location and the second robot occupies the first queue location, navigating the third robot to a second queue location;
   Causing the second robot to wait at the first queue location until the first robot no longer occupies the target location and causing the third robot to wait at the second queue location until the first robot no longer occupies the target location; and
   Navigating the second robot to the target location after the first robot leaves the target location.

2. The method of claim 1 wherein the environment is a warehouse space containing items for customer order fulfillment.

3. The method of claim 1 wherein the first queue location is offset from the target location by a predetermined distance; the target location being defined by a target pose and the first queue location being defined by a first queue pose; wherein the second robot navigates to the first queue location by navigating to the first queue pose.

4. The method of claim 3 wherein the second queue location is offset from the first queue location by a predetermined distance, the second queue location being defined by a second queue pose; wherein the second robot navigates to the second queue location by navigating to the second queue pose.

5. The method of claim 4 further including determining if the first robot continues to occupy the target location and if it does not, navigating the second robot to the target location, navigating the third robot to the first queue location, and causing the third robot to wait at the first queue location until the second robot no longer occupies the target location.

6. The method of claim 4 wherein the step of navigating the second robot to the target location includes navigating the second robot to the target pose and navigating the third robot to the first queue location includes navigating the second robot to the first queue pose.

7. A system for queuing robots destined for a target location, comprising:
   A management system;
   At least first, second, and third robots destined for a target location;
   Wherein the management system is configured to communicate with the at least first, second, and third robots and to:
   determine if the first robot occupies the target location;
   If it is determined that the first robot occupies the target location, determine if a second robot has entered a predefined target zone proximate the target location;
   If it is determined that the second robot has entered the predefined target zone, navigate the second robot to a first queue location;
   Cause the second robot to wait at the first queue location until the first robot no longer occupies the target location;
   Determine if the third robot has entered the predefined target zone when the first robot occupies the target location and the second robot occupies the first queue location;
   If it is determined that the third robot has entered the predefined target zone while the first robot occupies the target location and the second robot occupies the first queue location, the system directs the third robot to navigate to a second queue location and causes the third robot to wait at the second queue location until the first robot no longer occupies the target location; and
   Navigate the second robot to the target location after the first robot leaves the target location.

8. The system of claim 7 wherein the environment is a warehouse space containing items for customer order fulfillment.

9. The system of claim 7 wherein the first queue location is offset from the target location by a predetermined distance; the target location being defined by a target pose and the first queue location being defined by a first queue pose; wherein the second robot navigates to the first queue location by navigating to the first queue pose.

10. The system of claim 9 wherein the second queue location is offset from the first queue location by a predetermined distance, the second queue location being defined by a second queue pose; wherein the third robot navigates to the second queue location by navigating to the second queue pose.

11. The system of claim 10 wherein the management system is further configured to determine if the first robot continues to occupy the target location and if it does not, the system directs the second robot to navigate to the target location, the system directs the third robot to navigate the to the first queue location, and the system causes the third robot to wait at the first queue location until the second robot no longer occupies the target location.

12. The system of claim 11 wherein the management system is further configured to direct the second robot to the target location by navigating it to the target pose and to direct the third robot to the first queue location by navigating it to the first queue pose.

13. A robot capable of navigating to predefined locations in an environment containing at least a first additional robot and a second additional robot, the robot, the first additional robot, and the second additional robot capable of interacting with a management system, the robot comprising:
   A mobile base;
   A communication device enabling communication between the robot and the management system;
   A processor, responsive to communications with the management system, configured to:
   Navigate the robot to a target location in the environment;
   Determine if the first additional robot occupies the target location;

If it is determined that the first additional robot occupies the target location, determine if the robot has entered a predefined target zone proximate the target location;

If it is determined that the robot has entered the predefined target zone, navigate the robot to a first queue location unless the second additional robot occupies the first que location;

If the first queue location is not occupied by the second additional robot, cause the robot to wait at the first queue location until the first additional robot no longer occupies the target location and then navigate the robot to the target location;

If the first queue location is occupied by the second additional robot, cause the robot to wait at the second queue location until the second additional robot no longer occupies the first que location and then navigate the robot to the first que location.

\* \* \* \* \*